United States Patent [19]
Tanaka et al.

[11] Patent Number: 4,478,894
[45] Date of Patent: Oct. 23, 1984

[54] ONE-PACK TYPE THERMOSETTING POLYURETHANE COATING COMPOSITION

[75] Inventors: Michio Tanaka, Shizuoka; Yoshio Kamatani, Osaka; Koji Nasu, Hyogo, all of Japan

[73] Assignee: Takeda Chemical Industries, Inc., Osaka, Japan

[21] Appl. No.: 445,099

[22] Filed: Nov. 29, 1982

[30] Foreign Application Priority Data

Nov. 30, 1981 [JP] Japan .................................. 56-193323

[51] Int. Cl.$^3$ ...................... B05D 3/02; C08G 18/10; C08G 18/28
[52] U.S. Cl. .............................. 427/388.2; 427/385.5; 427/393.5; 427/393.6; 528/67; 528/73; 528/75
[58] Field of Search ...................... 528/44, 67, 73, 75; 427/385.5, 388.2, 393.5, 393.6

[56] References Cited

U.S. PATENT DOCUMENTS 3,730,953 5/1973 Naito et al. ............................ 528/44

FOREIGN PATENT DOCUMENTS 1145952 3/1969 United Kingdom .

Primary Examiner—Herbert S. Cockeram
Attorney, Agent, or Firm—Antonelli, Terry & Wands

[57] ABSTRACT

Disclosed are a thermosetting polyurethane coating composition of one-pack type which comprises a product obtained by reacting (i) an isocyanate component having at least one oxadiazinetrione ring obtained by the reaction of bis(isocyanatomethyl)cyclohexane with carbon dioxide with (ii) a polyol component having a molecular weight of 400 to 50,000 at such a proportion as satisfying the relations: the number of hydroxyl group > the number of free isocyanate group and the number of oxadiazinetrione ring/(the number of hydroxyl group—the number of free isocyanate group)=0.1 to 10 and a process for producing the coating composition.

The composition has excellent storage stability and the cured coatings have no problems of yellowing and pinholes and are excellent in mechanical properties, chemical resistance and weather resistance.

9 Claims, No Drawings

ONE-PACK TYPE THERMOSETTING POLYURETHANE COATING COMPOSITION

This invention relates to a novel composition for polyurethane coatings and production of the coatings.

One-pack type thermosetting polyurethane coatings comprising a blocked polyisocyanate and a polyol resin are known. As blocking agents, phenolic, oxime and lactam compounds are generally used. However, the blocked polyisocyanates obtained with these blocking agents have high dissociation temperatures and a great energy is required for curing. Besides, the phenolic and lactam blocking agents, when liberated, have a strong odor and a toxicity. Furthermore, when an oxime blocking agent is used, the coatings show discoloration at baking, which is also not desired. On the other hand, sodium bisulfite, ethyl acetoacetate, etc. have been studied as blocking agents of low dissociation temperature, but in this case the mixtures of blocked isocyanate and polyol are low in stability and cannot be used as one-pack type coatings.

The present inventors have studies, for a long time, production of isocyanate components having oxadiazinetrione ring obtained by the reaction of a polyisocyanate with carbon dioxide and uses of thus produced isocyanate components. As a result, they have found that a product obtained by the reaction of an isocyanate component obtained by the reaction of bis(isocyanatomethyl)cyclohexane and carbon dioxide with a polyol component at a specific proportion is capable of dissociating at a low temperature and it provides polyurethane coatings of good storage stability. Thus, this invention has been accomplished.

This invention relates to a composition for one-pack type thermosetting polyurethane coatings which comprises containing a product obtained by reacting (i) an isocyanate component having oxadiazinetrione ring, which is obtained by the reaction of bis(isocyanatomethyl)cyclohexane with carbon dioxide with (ii) a polyol component at the proportion which satisfies the relations: the number of hydroxyl groups > the number of free isocyanate groups and the number of oxadiazinetrione rings/(the number of hydroxyl groups − the number of free isocyanate groups) = 0.1 to 10.

The isocyanate component having oxadiazinetrione ring used in this invention is obtained by the reaction of bis(isocyanatomethyl)cyclohexane with carbon dioxide and usually has oxadiazine-2,4,6-trione ring. The number of this oxadiazinetrione rings is 1, 2 or more and preferably 1 to 5.

As bis(isocyanatomethyl)cyclohexane, mention may be made of 1,3-bis(isocyanatomethyl)cyclohexane, 1,4-bis(isocyantomethyl)cyclohexane or mixtures thereof.

Said isocyanate may be in admixture with monocyanates such as methyl isocyanate, ethyl isocyanate, n-butyl isocyanate, ω-chlorohexyl isocyanate, cyclohexyl isocyanate, cyclohexylmethyl isocyanate, benzyl isocyanate, phenylethyl isocyanate, etc.

The reaction of bis(isocyanatomethyl)cyclohexane with carbon dioxide is carried out in the presence of a catalyst. As the catalyst, tertiary phosphines, arsenic compounds and hydroquinones may be used and the tertiary phosphines are especially effective. When an isocyanate having oxadiazinetrione ring has been obtained by the reaction of an isocyanate with carbon dioxide, the reaction product may be used, as it is, as the isocyanate component of this invention, but usually various compounds are preferably added thereto for termination of the reaction and stable preservation of the product. Such reaction terminators and stabilizers include alkylating agents, acylating agents, acids, ester derivatives, phenols, peroxides, sulfur, polysulfides, metal sulfides, halogens, etc. Especially, the isocyanate component having oxadiazinetrione ring to which an additive selected from peroxides, sulfur, polysulfides, metal sulfides and halogens is added is preferred because the reaction of oxadiazinetrione ring and isocyanate with hydroxyl group of polyol component smoothly proceeds.

In the preparation of the isocyanate component having oxadiazinetrione ring from bis(isocyanatomethyl)cyclohexane and carbon dioxide, adducts having terminal NCO group may also be used as the polyisocyanate. Such adducts can be obtained by reacting polyisocyanates with polyol compounds (e.g., ethylene glycol, propylene glycol, 1,4-butanediol, glycerine, trimethylolpropane, polyether polyol, polyester polyol, acrylic polyol, epoxy polyol, etc.) or polyamine compounds (e.g., ethylenediamine, hexamethylenediamine, phenylenediamine, polyether polyamine, polyamide polyamine, etc.) in an excess ratio of NCO group to active hydrogen of the polyol or polyamine compounds. Polyisocyanates, the isocyanate groups of which are partially blocked with a blocking agent and those having partially dimerized or trimerized NCO groups may also be used as the polyisocyanates.

When the isocyanate component having oxadiazinetrione ring contains unreacted isocyanate monomers, low functional substances, etc. and, therefore, is unsuitable to use as it is, it is also possible to remove the monomers, low functional substances, etc. by appropriate methods such as distillation, extraction, crystallization, etc. The isocyanate component normally has at least one free isocyanate group.

As the polyol component to be reacted with the isocyanate component (i) in this invention, mention may be made of a compound containing at least two active hydrogens and having a molecular weight of 400 to 50,000. Use of a polyol having a molecular weight of less than 400 gives a coating inferior in chemical resistance, while use of a polyol having a molecular weight of more than 50,000 provides poor workability in coating and does not produce a smooth coating. Preferred is a polyol having 2 to 50 hydroxyl groups in one molecule and having a molecular weight of 500 to 30,000. When an isocyanate component having 1 to 2 oxadiazinetrione rings in one molecule is used, the polyol component to be used is preferably one having 2 to 4 hydroxyl groups in one molecule and a molecular weight of 400 to 30,000. The compound may be the one having functional group containing active hydrogen such as carboxyl group, amino group, thiol group, etc. in addition to hydroxyl groups. Specifically, there may be suitably used polyester polyols, polyether polyols, polyether-ester polyols, polyester-amide polyols, acrylic polyols, polyurethane polyols, epoxy polyols, epoxy-modified polyols, polyhydroxyalkanes, oil-modified polyols, castor oil or mixtures thereof.

Examples of said polyester polyols are reaction products of polyhydric alcohols and polybasic acids. As the polyhydric alcohols, mention may be made of ethylene glycol, propylene glycol, butylene glycol, hexylene glycol, neopentyl glycol, cyclohexanedimethanol, diethylene glycol, triethylene glycol, polyethylene glycol, dipropylene glycol, polyoxypropylene glycol, polyoxybutylene glycol, glycerol, trimethylolpropane, pentaerythritol, sorbitol, etc. As the polybasic acids, mention may be made of succinic acid, adipic acid, azelaic acid, sebacic acid, phthalic acid, isophthalic acid, terephthalic acid, tetrahydrophthalic acid, hexahydrophthalic acid, maleic acid, fumaric acid and anhydrides thereof, etc. Further suitable examples are polyester polyols obtained by ring opening polymerization of lactones such as caprolactone, methylcaprolactone, etc. with glycols, etc. There can also be used oil-modified polyols. Such polyols can be obtained by modifying said polyester polyols with fatty acids such as coconut, cotton seed and safflower fatty acid.

Examples of the polyether polyols are those which are obtained by polymerization of epoxide compounds such as ethylene oxide, propylene oxide, butylene oxide, tetrahydrofuran, styrene oxide, epichlorohydrin, phenylglycidyl ether, allylglycidyl ether, etc. in the presence of a catalyst such as boron trifluoride or by addition of these epoxide compounds alone or as a mixture or alternately to reactive hydrogen atom containing initiators. As the reactive hydrogen atom-containing initiators, mention may be made of water, polyols such as ethylene, glycol, propylene glycol, glycerol, trimethylolpropane, pentaerythritol, sorbitol, etc., amino alcohols such as ethanol amine, polyamines such as ethylenediamine, etc.

As examples of the polyether-ester polyols, mention may be made of those which are obtained by subjecting said polyether polyols and polybasic acids to polyesterification reaction and those which have both the segments of polyether and polyester in one molecule and which are obtained by ring-opening copolymerization of epoxide compounds and acid anhydrides.

Examples of the polyester-amide polyols are those which are obtained by said polyesterification reaction where amino group-containing starting materials such as ethylenediamine, propylenediamine, hexamethylenediamine, xylylenediamine, hydrogenated xylylenediamine, ethanolamine, propanolamine, etc. are additionally used.

The hydroxyl group-containing polymers generally called acrylic polyols can be prepared by copolymerizing polymerizable monomers containing at least one hydroxyl group in one molecule with other monomers copolymerizable with said monomers. As the hydroxyl group-containing monomers, mention may be made of hydroxyethyl acrylate, hydroxypropyl acrylate, hydroxybutyl acrylate, trimethylolpropane monoacrylate, their corresponding methacrylic acid derivatives, polyhydroxyalkyl maleate and fumarates, etc. As examples of the copolymerizable monomers, mention may be made of, for example, acrylic acid, its methyl, ethyl, propyl, butyl, 2-ethylhexyl esters, methacrylic acid, maleic acid, fumaric acid, itaconic acid and their esters as enumerated above, and vinyl monomers such as styrene, α-methylstyrene, vinyl acetate, acrylonitrile, methacrylonitrile, etc.

As examples of polyurethane polyols, mention may be made of reaction products of polyols and polyisocyanates which have terminal hydroxyl group. Examples of the polyols are polyols such as ethylene glycol, propylene glycol, butylene glycol, hexylene glycol, neopentyl glycol, cyclohexanedimethanol, diethylene glycol, triethylene glycol, dipropylene glycol, glycerol, trimethylolpropane, pentaerythritol, sorbitol, etc. or polymer polyols such as polyester polyol, polyether polyol, polyester ether polyol, polyester amide polyols, etc. As the polyisocyanates, mention may be made of polyisocyanates such as tetramethylene diisocyanate, hexamethylene diisocyanate, 2,6-diisocyanatomethylcaproate, 3-isocyanatomethyl-3,5,5-trimethylcyclohexyl isocyanate, 4,4'-methylenebis(cyclohexyl isocyanate), 1,3- or 1,4-bis(isocyanatomethyl)cyclohexane, methylcyclohexane-2,4-diisocyanate, m- or p-phenylene diisocyanate, diphenylmethane-4,4'-diisocyanate, 2,4- or 2,6-tolylene diisocyanate, 1,3- or 1,4-xylylene diisocyanate or dimers, trimers, etc. of these polyisocyanates. Furthermore, reaction products of said polyisocyanates with said polyols a part of which is substituted with an amino compound such as ethylene-diamine, propylenediamine, hexamethylenediamine, xylylenediamine, bisaminomethylcyclohexane, 3-aminomethyl-3,5,5-trimethylcyclohexylamine, ethanolamine, propanolamine, etc. may also be used as the polyurethane polyols.

Examples of the epoxypolyols are epoxy resins obtained by condensation reaction of a polyphenol compound or its ring hydrogenated product with epichlorohydrin. Besides these resins, epoxy ester resins obtained by reacting a fatty acid with an epoxy resin or modified epoxy resins obtained by reacting an alkanolamine with an epoxy resin may also be used.

Examples of the polyhydroxyalkanes are hydrolyzed products of vinyl acetate homopolymers or copolymers of vinyl acetate with other ethylenic copolymerizable monomers and polybutadiene polyols.

Not only the hydroxyl group-containing compounds of relatively high molecular weight mentioned hereinabove, but low molecular weight polyols having a molecular weight of about 62 to 400 may be used as mixtures. As these low molecular weight polyols, mention may be made of ethylene glycol, propylene glycol, butylene glycol, hexylene glycol, neopentyl glycol, cyclohexanedimethanol, glycerol, trimethylolpropane, pentaerythritol, diethylene glycol, triethylene glycol, dipropylene glycol, etc.

The proportion of (i) the isocyanate component to (ii) the polyol component to be reacted is such that satisfies the relations: the number of hydroxyl groups of the polyol component > the number of free isocyanate groups and the number of oxadiazinetrione rings/(the number of hydroxyl groups of the polyol component — the number of free isocyanate groups)=0.1 to 10, preferably 0.5 to 3, more preferably 0.6 to 1.6. In case of the number of hydroxyl groups of the polyol component ≦ the number of free isocyanate groups, oxadiazinetrione rings in the composition are not subjected to crosslinking. When the ratio of the number of oxadiazinetrione rings/(the number of hydroxyl groups of the polyol component — the number of free isocyanate groups) is less than 0.1, there cannot be obtained a merit of curing at low temperatures which is a characteristic of oxadiazinetrione rings due to a small content of oxadiazinetrione rings. When the above ratio exeeds 10, the composition has a higher viscosity, which makes poor workability. In general, the number of hydroxyl groups of the polyol component are arbitrarily selected in the range of 1.1 to 21, preferably 1.5 to 6.0, and the number of free isocyanate groups in the range of 1 to 4.0.

The reaction of the isocyanate component with the polyol component can be carried out by known methods in solvents free from active hydrogen or without solvents. Known catalysts for reaction of NCO group and OH group such as tertiary amines, organo metallic compounds, organic acid salts, inorganic salts, etc. may be used.

Thus obtained composition of this invention is generally used as one-pack type composition and the composition as it is or as a solution is applied to the surface to be coated and is cured by baking. At the time of actual use, there may be added known catalysts such as tertiary amines, tertiary phosphines, organo metallic compounds, organic acid salts, inorganic salts, etc. for acceleration of the reaction of oxadiazinetrione ring with OH group. Furthermore, if necessary, there may be optionally used, e.g., pigments, dyes, leveling agents, antifoamers, anti-sag agents, etc. Polyol components as mentioned hereinbefore may also be added to the composition of this invention.

The composition of this invention is useful for coating of metals such as iron, aluminum, etc., woods, plastics, rubbers, roofing tiles, concretes, etc. The composition of this invention has a baking temperature 30° to 50° C. lower than that of the conventional urethane coatings and besides has a good storage stability. Furthermore, the coating obtained by baking the composition of this invention at 100° to 150° C. for 1 to 30 minutes has no problems of yellowing and pin-holes and is excellent in mechanical properties, chemical resistance and weather resistance. It is especially good in the balance of hardness and flexibility and is suitable for production of pre-coat metals.

The following examples will further illustrate this invention.

REFERENCE EXAMPLE 1

To 971 g of 1,3-bis(isocyanatomethyl)cyclohexane was added 3.0 g of tri-n-butylphosphine while introducing carbon dioxide thereinto at 10° C. and the reaction was carried out for 5 hours under stirring. Then, carbon dioxide was replaced with nitrogen and 3.8 g of benzoyl peroxide was added to the reaction product and the product was stirred for 80 minutes. Starting materials were removed from the product by evaporation with a film evaporator to obtain 280 g of viscous liquid of pale yellow. This product had a NCO content of 4.35 meq/g, an oxadiazinetrione content of 2.22 meq/g and a residual monomer content of 0.8%.

REFERENCE EXAMPLE 2

Using 194 g of 1,3-bis(isocyanatomethyl)cyclohexane and 2.0 g of tri-n-butylphosphine, the reaction was carried out for 8 hours in the same manner as in Reference Example 1 and the reaction was terminated by the addition of 2.6 g of benzoyl peroxide. The reaction product was dissolved in 100 ml of toluene and to the solution was added 500 ml of n-hexane. The mixture was well shaken and the solvent layer was removed. To the extraction residue was added butyl acetate to make a solution containing 80% of non-volatile matter. This solution had a NCO content of 2.70 meq/g, an oxadiazinetrione content of 2.01 meq/g and contained 13% of the starting diisocyanate.

EXAMPLE 1

76 g of the polyisocyanate obtained in Reference Example 1 was dissolved in 200 g of butyl acetate. To the solution were added 171 g of polyester diol (prepared from phthalic anhydride, ethylene glycol and diethylene glycol; nonvolatile matter: 100%; and OH value: 115) and 54 g of polyester triol (prepared from phthalic anhydride, trimethylolpropane and diethylene glycol; nonvolatile matter: 100%; and OH value: 155). To the mixture was further added 0.05 g of dibutyltin dilaurate and the reaction was carried out at 70° C. for 2 hours. Most of NCO groups disappeared. The product was a liquid stable for more than 3 months at room temperature. To the product was added 0.2% of 1,3-diacetoxytetrabutyldistannoxane and this was coated on a cold-rolled steel panel and was heated at 150° C. for one minute to obtain a tough coating. Properties of this coating are shown in Table 1.

EXAMPLE 2

106 g of the polyisocyanate solution obtained in Reference Example 2 and 92 g of polyester diol (prepared from adipic acid and 1,4-butane diol; non-volatile matter: 100%; and OH value: 220) were dissolved in 155 g of butyl acetate and 0.02 g of dibutyltin dilaurate was added thereto. Then, the reaction was carried out at 80° C. for 2 hours to find that NCO group mostly disappeared. To the product were added 56 g of polyester polyol Takelac ®U-25 (non-volatile matter: 75%; OH value: 141; manufactured by Takeda Chemical Industries, Ltd.) and 0.4 g of 1,3-diacetoxytetrabutyl stannoxane, followed by mixing. The mixture was coated and cured in the same manner as in Example 1. Properties of the resultant coating are shown in Table 1.

TABLE 1

| Test items | Example 1 | Example 2 |
| --- | --- | --- |
| Pencil scratch test | 2H | H |
| Cross hatch adhesion | 100/100 | 100/100 |
| Mandrel bending resistance test (mm) | 2 | 2 |
| Erichsen test (mm) | 8 | 8 |
| Impact test (½ inch, g × cm) | 1000 × 50 | 1000 × 50 |
| Solvent resistance[1] | Good | Good |
| Weather resistance[2] | No change | No change |

[1]Rubbing test with ethyl acetate
[2]By Dew Cycle Weatherometer for 200 hours

EXAMPLE 3

362 g of a polyester polyol (non-volatile matter: 100%; and OH value: 155) prepared from phthalic anhydride, trimethylolpropane and diethylene glycerol and 9.7 g of bis(isocyanatomethyl)cyclohexane were dissolved in 248 g of butyl acetate. To the solution was added 0.04 g of dibutyltin dilaurate and the reaction was carried out at 70° C. for 3 hours to obtain a polyurethane polyol (OH value: 81.54; and non-volatile matter: 60%).

To 412.8 g of thus obtained polyol was added 76 g of the polyisocyanate obtained in Reference Example 1 and the reaction was carried out at 75° C. for 2 hours. Most of NCO groups disappeared. The product was a liquid stable for more than 3 months at room temperature. To this product was added 0.2% of 1,3-diacetoxytetrabutyldistannoxane and this was coated on a cold-rolled steel panel and heated at 120° C. for 20 minutes to obtain a tough coating. Properties of this coating are shown in Table 2.

EXAMPLE 4

To 282.1 g of the polyurethane polyol obtained in Example 3 was added 76 g of the polyisocyanate obtained in Reference Example 1 and the reaction was carried out at 75° C. for 2 hours. Most of NCO groups disappeared. The product was stable for more than 3 months at room temperature. To this product was added 0.2% of 1,3-diacetoxytetrabutyldistannoxane and the mixture was coated on a cold-rolled steel panel and heated at 120° C. for 20 minutes to obtain a tough coating, properties of which are shown in Table 2.

TABLE 2

| Test items | Example 3 | Example 4 |
| --- | --- | --- |
| Pencil scratch test | HB - H | 2H |
| Cross hatch adhesion | 100/100 | 100/100 |
| Mandrel bending resistance test (mm) | 2 | 3 |
| Erichsen test (mm) | 8 | 7.5 |
| Impact test (½ inch, g × cm) | 1000 × 50 | 1000 × 40 |
| Solvent resistance[1] | Good | Good |
| Weather resistance[2] | No change | No change |

[1]Rubbing test with ethyl acetate
[2]By Dew Cycle Weatherometer for 200 hours

EXAMPLE 5

To 1870 g of acrylic polyol Takelac ®UA-999 (OH value: 30; non-volatile matter: 50%; prepared by Takeda Chemical Industries, Ltd.) comprising styrene, butyl acrylate and 2-hydroxy ethyl methacrylate was added 92 g of the polyisocyanate obtained in Reference Example 1 and the reaction was carried out at 75° C. for 4 hours to obtain a one-pack type polyurethane resin having substantially no NCO groups. The product was stable for more than 3 months at room temperature. To this resin was added 0.2% of 1,3-diacetoxytetrabutyldistannoxane. The mixture was coated on a cold-rolled steel panel and heated at 120° C. for 20 minutes to obtain a tough coating, properties of which are shown in Table 3.

EXAMPLE 6

500 g of an epoxy resin Epikote ®1001 (OH equivalent: 500; and manufactured by Shell International Chemical Corp.) was dissolved in 300 g of Cellosolve acetate and 300 g of xylene. To the solution was added 138 g of the polyisocyanate obtained in Reference Example 1 and the reaction was carried out at 80° C. for 4 hours to obtain a one-pack type polyurethane resin having no NCO groups. The product was stable for more than 3 months at room temperature. To this resin was added 0.2% of 1,3-diacetoxytetrabutyldistannoxane. The mixture was coated on a cold-rolled steel panel and heated at 120° C. for 20 minutes to obtain a tough coating, properties of which are shown in Table 3.

TABLE 3

| Test items | Example 5 | Example 6 |
| --- | --- | --- |
| Pencil scratch test | H | 2H |
| Cross hatch adhesion | 100/100 | 100/100 |
| Mandrel bending resistance test (mm) | 2 | 4 |
| Erichsen test (mm) | 7.5 | 6.5 |
| Impact test (½ inch, g × cm) | 1000 × 40 | 1000 × 20 |
| Solvent resistance[1] | Good | Good |
| Weather resistance[2] | No change | No change |

[1]Rubbing test with ethyl acetate
[2]By Dew Cycle Weatherometer for 200 hours

We claim:

1. A thermosetting polyurethane coating composition of one-pack type which comprises a product obtained by reacting (i) an isocyanate component having at least one oxidiazinetrione ring obtained by the reaction of bis(isocyanatomethyl)cyclohexane with carbon dioxide with (ii) a polyol component having a molecular weight of 400 to 50,000 at such a proportion as satisfying the relations: the number of hydroxyl group > the number of free isocyanate group and the number of oxadiazinetrione ring/(the number of hydroxyl group — the number of free isocyanate group)=0.6 to 1.6; said polyol component (ii) being a polyester polyol, a polyurethane polyol, an acrylic polyol or an epoxy polyol.

2. A thermosetting polyurethane coating composition according to claim 1, wherein the bis(isocyanatomethyl)cyclohexane is 1,3-bis(isocyanatomethyl)cyclohexane, 1,4-bis(isocyanatomethyl)cyclohexane or a mixture thereof.

3. A thermosetting polyurethane coating composition according to claim 1, wherein the isocyanate component has 1 to 5 oxadiazinetrione rings.

4. A thermosetting polyurethane coating composition according to claim 1, wherein the polyol component (ii) is a compound having 2 to 50 hydroxyl groups in one molecule and having a molecular weight of 500 to 30,000.

5. A process for producing a thermosetting polyurethane coating composition of one-pack type, which comprises reacting (i) an isocyanate component having at least one oxidiazinetrione ring obtained by the reaction of bis(isocyanatomethyl)cyclohexane with carbon dioxide with (ii) a polyol component having a molecular weight of 400 to 50,000 at such a proportion as satisfying the relations: the number of hydroxyl group > the number of free isocyanate group and the number of oxadiazinetrione ring/(the number of hydroxyl group — the number of free isocyanate group)=0.6 to 1.6; said polyol component (ii) being a polyester polyol, a polyurethane polyol, an acrylic polyol or an epoxy polyol.

6. A coating process which comprises coating on a surface to be coated a composition comprising a product obtained by reacting (i) an isocyanate component having at least one oxadiazinetrione ring obtained by the reaction of bis(isocyanatomethyl)cyclohexane with carbon dioxide with (ii) a polyol component having a molecular weight of 400 to 50,000 at such a proportion as satisfying the relations: the number of hydroxyl group > the number of free isocyanate group and the number of oxadiazinetrione ring/(the number of hydroxyl group — the number of free isocyanate group)=0.6 to 1.6 and baking the coated composition at about 100° to 150° C. for about 1 to 30 minutes; said polyol component (ii) being a polyester polyol, a polyurethane polyol, an acrylic polyol or an epoxy polyol.

7. A thermosetting polyurethane coating composition according to claim 1, wherein the polyol component (ii) is an acrylic polyol.

8. A process according to claim 5, wherein the polyol component (ii) is an acrylic polyol.

9. A coating process according to claim 6, wherein the polyol component (ii) is an acrylic polyol.

* * * * *